Figure 1:
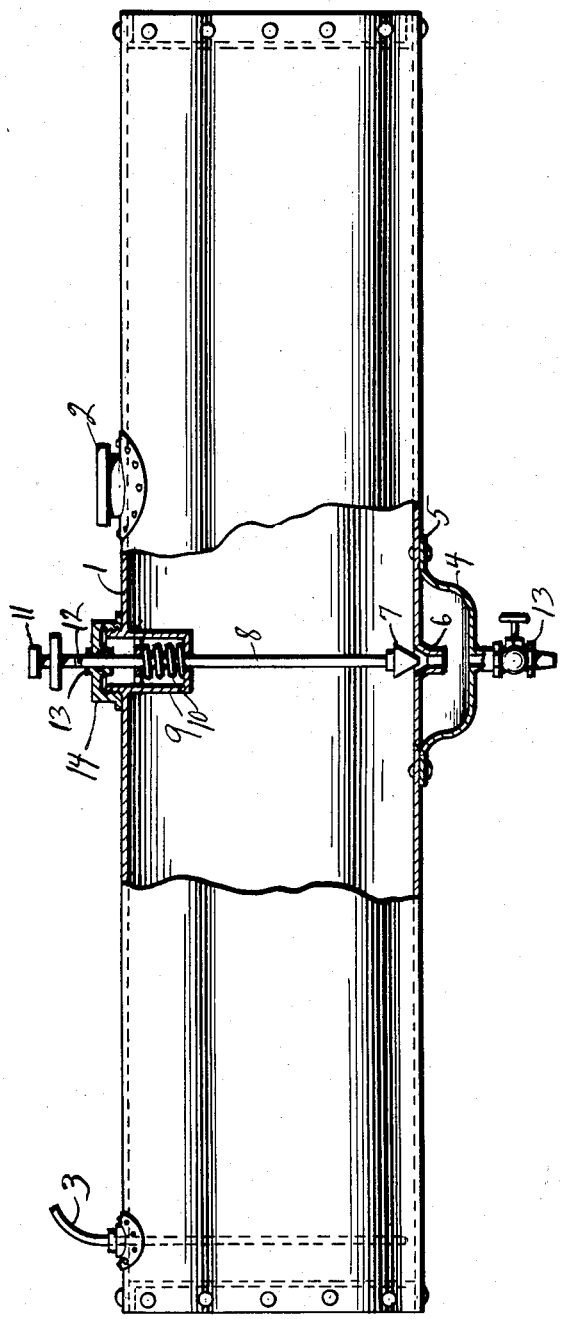

Sept. 2, 1924.  1,507,098

D. D. WALKER

GASOLINE TANK FOR MOTOR VEHICLES

Filed July 5, 1921

David D. Walker, INVENTOR.

Witness.

BY

ATTORNEY.

Patented Sept. 2, 1924.

1,507,098

UNITED STATES PATENT OFFICE.

DAVID D. WALKER, OF MAYFIELD, IDAHO.

GASOLINE TANK FOR MOTOR VEHICLES.

Application filed July 5, 1921. Serial No. 482,357.

*To all whom it may concern:*

Be it known that I, DAVID D. WALKER, a citizen of the United States, residing at Mayfield, in the county of Elmore and State of Idaho, have invented certain new and useful Improvements in a Gasoline Tank for Motor Vehicles, of which the following is a specification.

This invention relates to a gasoline tank for motor vehicles in which means is provided for separating the liquid contents thereof which usually is gasoline from heavy sediment and foreign matter such as water, which may be mixed therewith and in thus preventing the sediment and foreign matter from passing through the outlet to place of use.

With the above and numerous other objects in view, the invention consists in certain novel features of construction and arrangement of parts as will be hereinafter more fully described and claimed.

In the drawing:—

Figure 2:

Figure 1 is an elevational view of a tank, the middle portion thereof being broken away showing the collector for the sediment and foreign matter in cross section, and Figure 2 is a top plan view of the top of the valve stem.

Referring to the drawing in detail it will be seen that the ordinary gasoline tank 1 of a motor vehicle is provided with a filling cap 2 and an outlet pipe 3 leading to a carburetor, not shown. At the lowest point in the bottom of the tank is shown a cup-shaped collector 4, which in this instance, is provided with the flange 5 at its top, which may be attached to the tank 1 in any suitable manner. A conical shaped valve seat 6 leads into the cup-shaped collector 4 from the tank 1 and a conical shaped valve 7 is adapted to cooperate therewith. This valve 7 is provided with a stem 8 extending through the top of the tank 1. A compartment 9 depends from the top of the tank 1 and the stem 8 extends therethrough. A coil spring 10 situated within the compartment 9 normally holds the valve 7 in a raised position so as to not engage the valve seat 6. A handle 11 is provided at the upper end of the stem 8 and threads 12 are provided on the valve stem 8 adapted to engage threads within the opening 13 of the cap 14 which engages a portion of the compartment 9 as clearly shown in Figure 1. By pressing downwardly upon the handle 11 the valve 7 may be placed in engagement with the valve seat 6 and by giving this handle 11 a half turn the threads 12 will engage the threads of the cap 14 thus holding the valve mechanism in a closed position. When the valve mechanism is in this closed position the outlet cock 13 may be open so as to allow the sediment and water or other foreign matter which may have collected in the collector 4 to be drained therefrom and will in no way interfere with the operation of the gasoline tank nor allow any air to pass therein through the valve seat 6.

Having thus described my invention what I claim as new is:—

In combination, a vessel, a cup shaped collector attached to the bottom of the vessel and communicating therewith, a valve seat in the bottom of the vessel communicating with the collector, a valve in the vessel for cooperation with the valve seat, a valve stem associated with the valve, a compartment depending from the top of the vessel having its upper end open and its lower end provided with an apertured closure through which the valve stem projects, a spring on the valve stem within the compartment for normally holding the valve open, a cap on the open end of the compartment and provided with a threaded opening through which the valve stem extends, said valve stem being provided with threads adapted to engage the threaded opening of the cap whereby the valve may be moved to a closed position when desired.

In testimony whereof I affix my signature in the presence of two witnesses.

DAVID D. WALKER.

Witnesses:
THOMAS A. SMITH,
CHAS. P. RUSSELL.